United States Patent
Wang

(10) Patent No.: US 7,797,488 B2
(45) Date of Patent: Sep. 14, 2010

(54) METHOD OF CREATING A MULTIPLE OF VIRTUAL SATA PORTS IN A DISK ARRAY CONTROLLER

(75) Inventor: Chan-Nan Wang, Kaohsiung County (TW)

(73) Assignee: Accusys, Inc., Hsinchu County (TW)

( * ) Notice: Subject to any disclaimer, the term of this patent is extended or adjusted under 35 U.S.C. 154(b) by 606 days.

(21) Appl. No.: 11/713,649

(22) Filed: Mar. 5, 2007

(65) Prior Publication Data
US 2008/0222354 A1 Sep. 11, 2008

(51) Int. Cl.
*G06F 12/00* (2006.01)

(52) U.S. Cl. ........................ 711/114; 711/112

(58) Field of Classification Search .......... 711/112, 711/114, 170
See application file for complete search history.

(56) References Cited

U.S. PATENT DOCUMENTS 7,167,958 B2 * 1/2007 Hashimoto et al. .......... 711/152

2007/0050538 A1 * 3/2007 Northcutt et al. ............ 711/112

* cited by examiner

*Primary Examiner*—Jasmine Song
(74) *Attorney, Agent, or Firm*—Muncy, Geissler, Olds & Lowe, PLLC

(57) ABSTRACT

A method of creating a multiple of virtual Serial Advanced Technology Attachment ports in a disk array controller, and the method builds a port multiplier in a Serial Advanced Technology Attachment disk array controller by a software method, and the port multiplier defines several slices capable of identifying the address of a computer host system. The port multiplier is connected to at least one disk set, and each disk is divided into several data blocks corresponding to data blocks of another disk of the same disk set to constitute a synchronously updated disk backup system. The software method provides a method of connecting several storage units to overcome the restriction on the point-to-point connection of the Serial Advanced Technology Attachment disk array system, so as to achieve a multi-driving function and a serial bus system.

8 Claims, 3 Drawing Sheets

METHOD OF CREATING A MULTIPLE OF VIRTUAL SATA PORTS IN A DISK ARRAY CONTROLLER

BACKGROUND OF THE INVENTION

1. Field of the Invention

The present invention relates to a method of creating a multiple of virtual Serial Advance Technology Attachment (SATA) ports in a disk array controller, and more particularly to a software method used for supporting a SATA disk array system, so that the SATA disk array can support virtual drives and several corresponding storage units similar to a single channel of a SCSI disk array and also can achieve a low pin count and a high-frequency transmission by a serial bus.

2. Description of the Related Art

Hard disk is one of the popular data storage devices having the feature of a high capacity, and thus becomes an indispensable storage device. In recent years, the transmission interface between hard disk and computer is developed from small computer system interface (SCSI) introduced at early 1980 to the integrated drive electronics (IDE) introduced at late 1980. Regardless of IDE disk interface or SCSI disk interface, a bus interface is adopted and each device of the bus topology requires a unique ID code, such as each IDE bus supports two sets of devices, and each set has a code. For instance, the SCSI disk interface can support eight sets of devices, and the wide SCSI can support 16 sets of devices, and a high-end SCSI interface can support up to 127 devices. Although a SCSI disk comes with good expandability and reliability, it is a high-priced product, and thus the IDE interface is still the mainstream for the interface of personal computers. In the IDE interfaces from Ultra ATA to Ultra ATA/66, and then to the current Ultra ATA/100 or Ultra ATA/133, the Ultra ATA/133 has encountered a bottleneck on the transmission speed, and the transmission speed no longer can meet the requirements of data transmission of a hard disk anymore. Therefore, a new specification is established, and the Serial ATA Organization establishes a SATA specification with the features of a low pin count and a high-frequency transmission (from 150 MB/s of Version 1.0 to 300 MB/s and 600 MB/s of versions 2.0 and 3.0). Therefore, the Serial ATA is expected to take over the Ultra ATA/133 and become an industrial standard of the storage interface for of the next generation of personal computer, and the Serial ATA inherits the advantages of the traditional ATA software compatibility and low price, and it also overcomes the limitation of the ATA that can be applied to the Direct Attached Storage (DAS) only, and the SATA extends its applications to Storage Area Network (SAN) and Network Attached Storage (NAS), and thus manufacturers and users have high expectations on the development of SATA. In addition to the high transmission speed, the improved Serial ATA cable and connector specifications allow users to integrate a hard disk with a flat cable easily. Since the contact point of the flat cable is designed as a goldfinger, therefore users do not have to worry about bending the pins while installing or removing the flat cable. With a good foolproof design, users can install a connector easily without the need of visual adjustment and inspection. The Serial ATA cable is slender and does not occupy much space of the computer housing that helps improving the air flow and heat dissipation of a computer system.

The Redundant Array of Inexpensive Disks (RAID) technology was first developed by a group of researchers at the University of California, Berkeley in 1987. After going through several generations of development, users have different requirements on data backup and generally adopt the high-priced SCSI interface or a low-priced IDE interface. Since the SATA disk has a high transmission rate and an affordable price, therefore SATA disks are recommended to be used as a storage device for data storage and backup. Referring to FIG. 1, the structure includes a computer host system 10 connected to a SATA disk array system 20 through an electric port 11, and the disk array system 20 has a disk array controller 30 connected to a disk set 40, and the disk set 40 includes a plurality of SATA disks 41, and the disk array system 20 can be set to different levels including RAID 0, RAID 1, RAID 2, RAID 3, RAID 4 and RAID 5 for the data storage and backup. If the computer host system 10 issues an instruction for reading or storing data, the disks 41 in the disk array system 20 will update and backup the data synchronously. Since the SATA interface is restricted by its point-to-point connection and transmission, therefore a single SATA electric port 11 can correspond to a logical disk set only. Although the SATA interface comes with a high-speed I/O transmission architecture, it cannot achieve the multi-driving access effect, and thus the SATA interface cannot meet user requirements when a large quantity of data is accessed.

SUMMARY OF THE INVENTION

Therefore, it is a primary objective of the present invention to overcome the foregoing shortcomings of the prior art by providing a method of creating a multiple of virtual SATA ports in a disk array controller.

Another objective of the present invention is to provide a method of supporting a multiple of virtual disks in a single SATA interface and using a low-priced solution to replace SCSI disk array systems.

A further objective of the present invention is to create a port multiplier in a SATA disk array controller by a software method, and the port multiplier defines a plurality of slices capable of identifying the address of a computer host system, and the port multiplier is connected to at least one disk set, and the disk set includes a plurality of disks, and each disk is divided into a plurality of data blocks, and the data blocks of such disk and the data blocks of other disks in the same disk set are updated and backed up synchronously. Therefore, the software method provides a method of connecting several storage units to overcome the restriction on the point-to-point connection of the SATA disk array system, so as to achieve a multi-driving function and a serial bus system. The invention also has the features of a low pin count and a high-frequency transmission.

DETAILED DESCRIPTION OF THE PREFERRED EMBODIMENTS

To make it easier for our examiner to understand the objective of the invention, its structure, innovative features, and performance, we use preferred embodiments together with the attached drawings for the detailed description of the invention.

Figure 1:
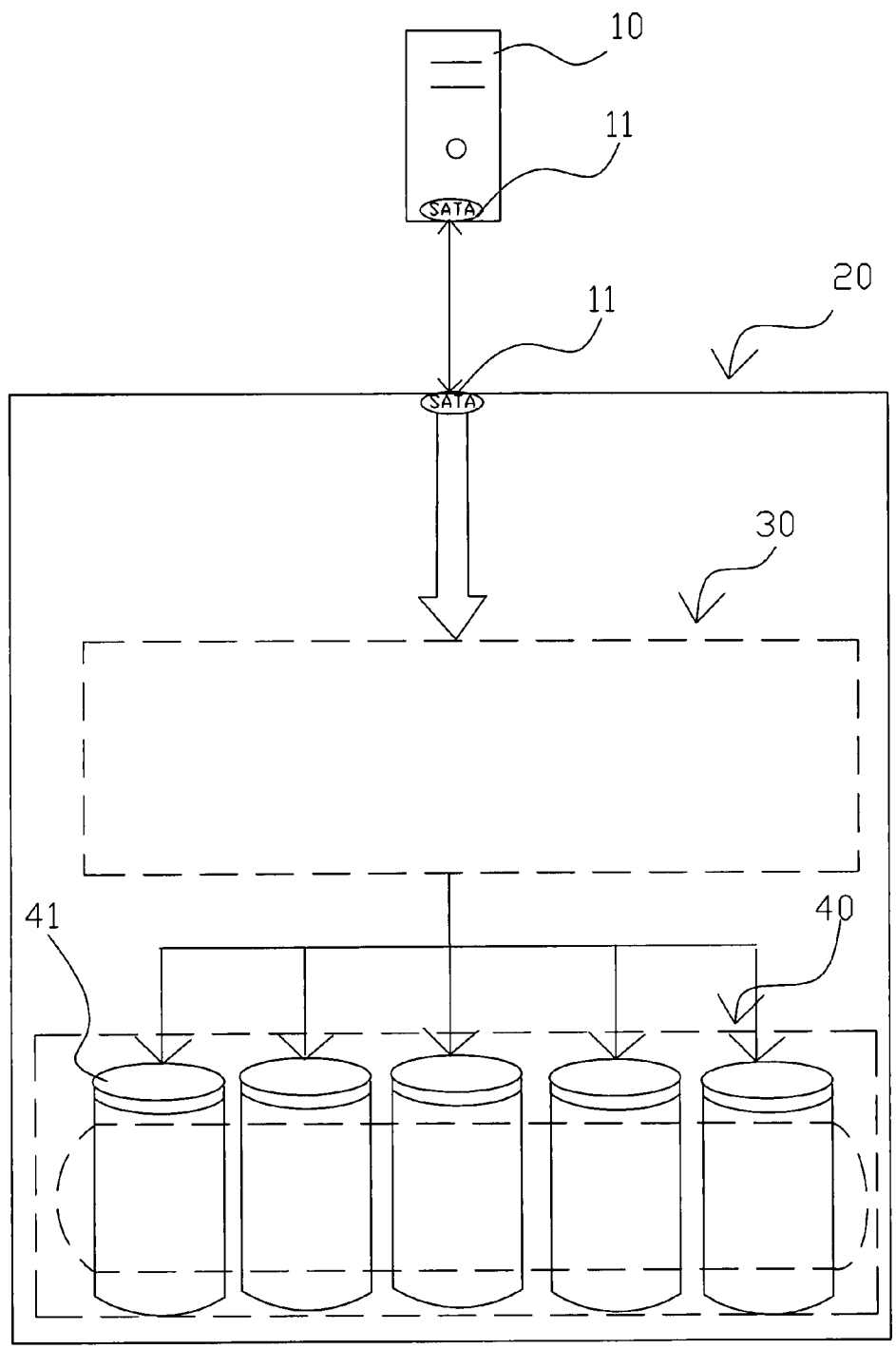
FIG. 1 is a schematic view of a structure of a prior art.
Figure 2:
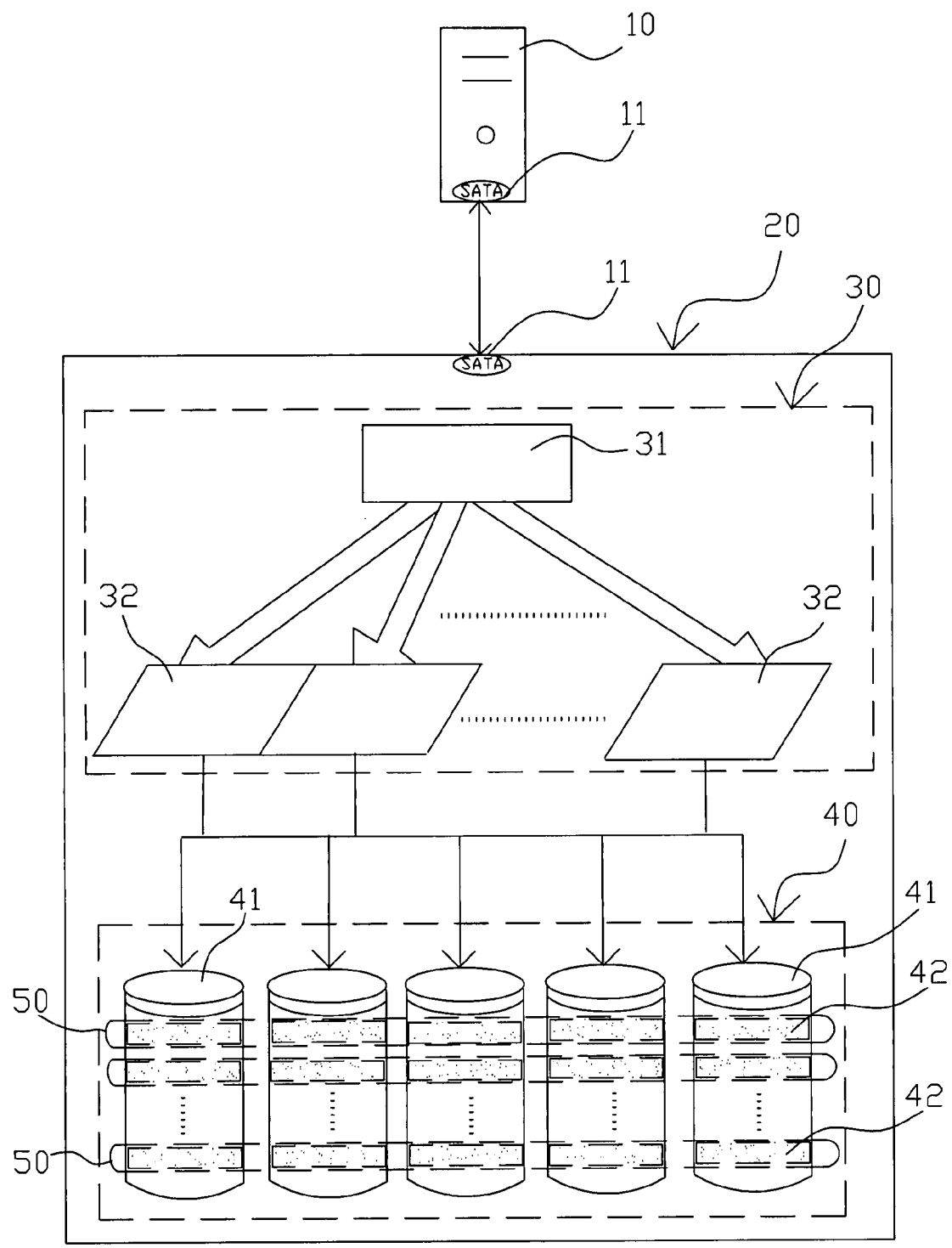
FIG. 2 is a schematic view of a structure in accordance with a preferred embodiment of the present invention.

Referring to FIG. 2 for a schematic view of a structure in accordance with a preferred embodiment of the present invention, the structure comprises a computer host system 10, and the computer host system 10 is connected to a SATA disk array system 20 through an electric port 11, and the disk array system 20 has a disk array controller 30 connected to a disk set 40, and the disk set 40 includes a plurality of SATA disks 41, and the disk array system 20 can store and backup data in different levels including RAID 0, RAID 1, RAID 2, RAID 3, RAID 4 and RAID 5.

During an application as shown in FIG. 2, a port multiplier 31 is built in the disk array controller 30 by a software method, and the port multiplier 31 defines a plurality of slices 32 (at most 15 slices can be defined in this embodiment) capable of identifying the address of a computer host system 10, and the port multiplier 31 is connected to a disk set 40 comprised of a plurality of SATA disks 41, and each disk 41 is divided into a plurality of data blocks 42, and the data block 42 of this disk 41 corresponds with the data blocks 42 of other disks 41 in the same disk set 40, and each of the corresponding data blocks 42 creates a logical disk set 50, and the logical disk sets 50 constitutes a one-to-one correspondence with each slice 32, so as to complete a synchronously updated data backup system. The software method provides a method of connecting several storage units to overcome the restriction on the point-to-point connection of the SATA disk array system, so as to achieve a multi-driving function and a serial bus system. The invention also has the features of a low pin count and a high-frequency transmission.

Figure 3:
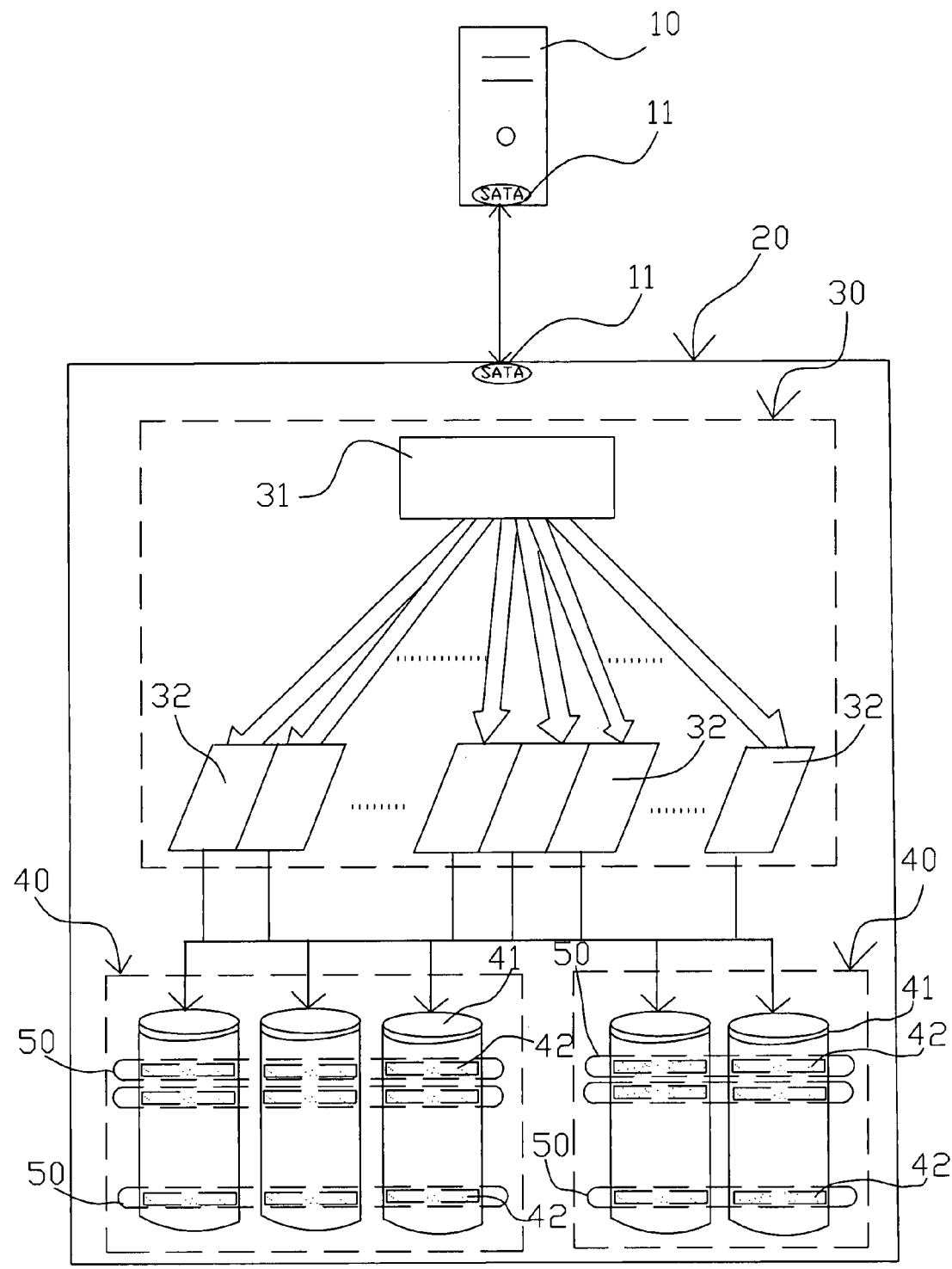
FIG. 3 is a schematic view of a structure in accordance with another preferred embodiment of the present invention.

Referring to FIG. 3 for a schematic view of a structure in accordance with another preferred embodiment of the present invention, the structure comprises a computer host system 10 connected to a SATA disk array system 20 through an electric port 11, and the disk array system 20 has a disk array controller 30 connected to a plurality of disk sets 40, and the disk set 40 includes a plurality of SATA disks 41, and the disk array system 20 can store and backup data into different levels including RAID 0, RAID 1, RAID 2, RAID 3, RAID 4 and RAID 5 according to user requirements.

In an application as shown in FIG. 3, a port multiplier 31 is built in the disk array controller 30 by a software method, and the port multiplier 31 defines a plurality of slices 32 capable of identifying the address of a computer host system 10 (at most 15 slices are defined in this embodiment). The port multiplier 31 is connected to a plurality of disk sets 40 (and this embodiment adopts two disk sets), and the disk set 40 is comprised of a plurality of disks 41, and each disk 41 is divided into a plurality of data blocks 42, and the data block 42 corresponds to a data block 42 of another disk 41 of the same disk set 40, and the corresponding data block 42 is built into a logical disk set 50, and the logical disk set 50 constitutes a one-to-one correspondence with each slice 32 to complete a synchronously updated data backup system. The software method provides a method of connecting several storage units to overcome the restriction on the point-to-point connection of the SATA disk array system, so as to achieve a multi-driving function and a serial bus system. The invention also has the features of a low pin count and a high-frequency transmission.

While the invention has been described by means of specific embodiments, numerous modifications and variations could be made thereto by those skilled in the art without departing from the scope and spirit of the invention set forth in the claims.

What is claimed is:

1. A method of creating a multiple of virtual Serial Advanced Technology Attachment ports in a disk array controller, comprising:

installing a disk set in said disk array controller, and said disk set is comprised of a plurality of disks, and said each disk is divided into a plurality of data blocks corresponding to data blocks of other disks of the same disk set for creating a plurality of logical disk sets respectively;

building a port multiplier into said disk array controller by a software method, and said port multiplier defines a plurality of slices capable of identifying the address of a computer host system;

constituting a one-to-one correspondence between said slices defined by said port multiplier and said plurality of logical disk sets respectively;

thereby, a method for said Serial Advanced Technology Attachment disk array system connects a plurality of storage units by a software method and overcomes the limitation of the point-to-point connection, so as to achieve a multi-driving function and a serial system bus, and also pursue a low pin count and a high-frequency transmission to accomplish a synchronously updated data backup system.

2. The method of creating a multiple of virtual Serial Advanced Technology Attachment ports in a disk array controller as recited in claim 1, wherein said slices come with a quantity of two or more.

3. The method of creating a multiple of virtual Serial Advanced Technology Attachment ports in a disk array controller as recited in claim 1, wherein said slices come with a quantity of fifteen.

4. The method of creating a multiple of virtual Serial Advanced Technology Attachment ports in a disk array controller as recited in claim 1, wherein a document file in said disk is accessed by RAID 1, RAID 2, RAID 3, RAID 4, or RAID 5.

5. A method of creating a multiple of virtual Serial Advanced Technology Attachment ports in a disk array controller, comprising:

installing at least one disk set in said disk array controller, and said disk set is comprised of a plurality of disks, and said each disk is divided into a plurality of data blocks corresponding to data blocks of another disk of the same disk set, for creating a plurality of logical disk sets respectively;

building a port multiplier into said disk array controller by a software method, and said port multiplier defines a plurality of slices capable of identifying the address of a computer host system;

constituting a one-to-one correspondence between said slices defined by said port multiplier and said plurality of logical disk sets respectively;

thereby, a method for said Serial Advanced Technology Attachment disk array system to connect a plurality of storage units by a software method and overcome the limitation of the point-to-point connection, so as to achieve a multi-driving function and a serial system bus, and also pursue a low pin count and a high-frequency transmission to accomplish a synchronously updated data backup system.

6. The method of creating a multiple of virtual Serial Advanced Technology Attachment ports in a disk array controller as recited in claim 5, wherein said slices come with a quantity of two or more.

7. The method of creating a multiple of virtual Serial Advanced Technology Attachment ports in a disk array controller as recited in claim 5, wherein said slices come with a quantity of fifteen.

8. The method of creating a multiple of virtual Serial Advanced Technology Attachment ports in a disk array controller as recited in claim 5, wherein a document file in said disk is accessed by RAID 1, RAID 2, RAID 3, RAID 4, or RAID 5.

* * * * *